United States Patent [19]
Korbutt et al.

[11] Patent Number: 5,275,210
[45] Date of Patent: Jan. 4, 1994

[54] NOSE GUIDE FOR A HEDDLE FRAME

[75] Inventors: Thomas A. Korbutt; Charles K. Johnson, both of Greer; Charles F. Kramer, Greenville, all of S.C.

[73] Assignee: Steel Heddle Mfg. Co., Greenville, S.C.

[21] Appl. No.: 928,128

[22] Filed: Aug. 11, 1992

[51] Int. Cl.⁵ .............................................. D03C 9/06
[52] U.S. Cl. ..................................... 139/92; 403/241; 403/354; 403/382
[58] Field of Search ...................... 403/241, 354, 382; 139/88, 91, 92

[56] References Cited

U.S. PATENT DOCUMENTS

| | | | |
|---|---|---|---|
| 3,874,419 | 4/1975 | Wagner | 139/91 |
| 3,901,282 | 8/1975 | Kramer et al. | 139/92 |
| 4,088,158 | 5/1978 | Kennedy | 139/92 |
| 4,503,890 | 3/1985 | Kramer | 139/92 |
| 4,565,223 | 1/1986 | Hall | 139/91 |
| 4,572,242 | 2/1986 | Shimizu | 139/91 |
| 4,966,203 | 10/1990 | Carrara | 139/91 |

FOREIGN PATENT DOCUMENTS

| | | | |
|---|---|---|---|
| 259759 | 2/1949 | Switzerland | 403/241 |

Primary Examiner—Andrew M. Falik
Attorney, Agent, or Firm—Dority & Manning

[57] ABSTRACT

A nose guide including a fastening mechanism for attaching the nose guide to a harness frame on a weaving loom. The fastening mechanism includes a pair of elongated straps and a pair of bosses carried on the inner surfaces of the straps which are provided to fit within elongated complimentary recesses provided in the straps. Fasteners extend through the bosses for securing the opposed straps together for attaching the nose guide to a slat of the harness frame.

7 Claims, 2 Drawing Sheets 5,275,210

NOSE GUIDE FOR A HEDDLE FRAME

BACKGROUND OF THE INVENTION

This invention relates to a nose guide for use on a harness frame of a weaving machine. The invention relates generally to a weaving loom harness wherein warp yarns are held in individual heddles and are supported on a heddle frame and in particular, to a unique nose guide attachment for wooden nose guides. Normally, wooden nose guides are glued to the top and bottom of aluminum slats forming part of the harness frame at locations that coincide with stationary guide supports in the weaving machine. When the slats are wood, wood guides are tenoned and glued into a mortised location. As a result, when the wooden guides are worn out or damaged, they are very difficult to replace by the user.

To aid in repairability, wood guides have been attached with screws without glue. However, due to the thin legs or side plates of the wood guide, they sometimes tend to warp or wear quickly against the adjacent guides in the weaving machine.

Accordingly, it is an important object of the present invention to provide a fastening mechanism for attaching nose guides to a harness frame which can be readily removed for replacement.

Another important object of the present invention is to provide a fastening mechanism for attaching wooden nose guides to harness frames which do not obstruct the surface plane of the nose guide and apply forces over a substantial portion of the side plates of the nose guide to minimize warping of the nose guide.

SUMMARY OF THE INVENTION

According to the present invention, the above objects are accomplished by utilizing a fastening mechanism for attaching a nose guide to a harness frame of a weaving loom which has a pair of spaced side plates terminating in a head portion.

The harness frame includes a pair of spaced slats upon which nose guides are attached. The nose guides include side plates which extend on opposed sides of a respective slat of the harness frame. The fastening mechanism includes a pair of elongated straps, each having inner and outer surfaces. A pair of spaced bosses are carried on the inner surface of each of the elongated straps. Elongated recesses complimentary in shape to the elongated straps are provided in the side plates of the nose guides for receiving the straps. Fastening means are provided for extending through the bosses for securing opposed straps together for attaching the nose guides to the slats of the harness frame. In one particular embodiment, the nose guide is made of wood and the straps are made of nylon.

It should, of course, be understood that the description and drawings herein are illustrative merely and that variations and modifications and changes may be made to the arrangements shown and described without departing from the spirit of the invention.

Like numerals refer to common parts throughout the several views.

DESCRIPTION OF PREFERRED EMBODIMENT

Figure 1:
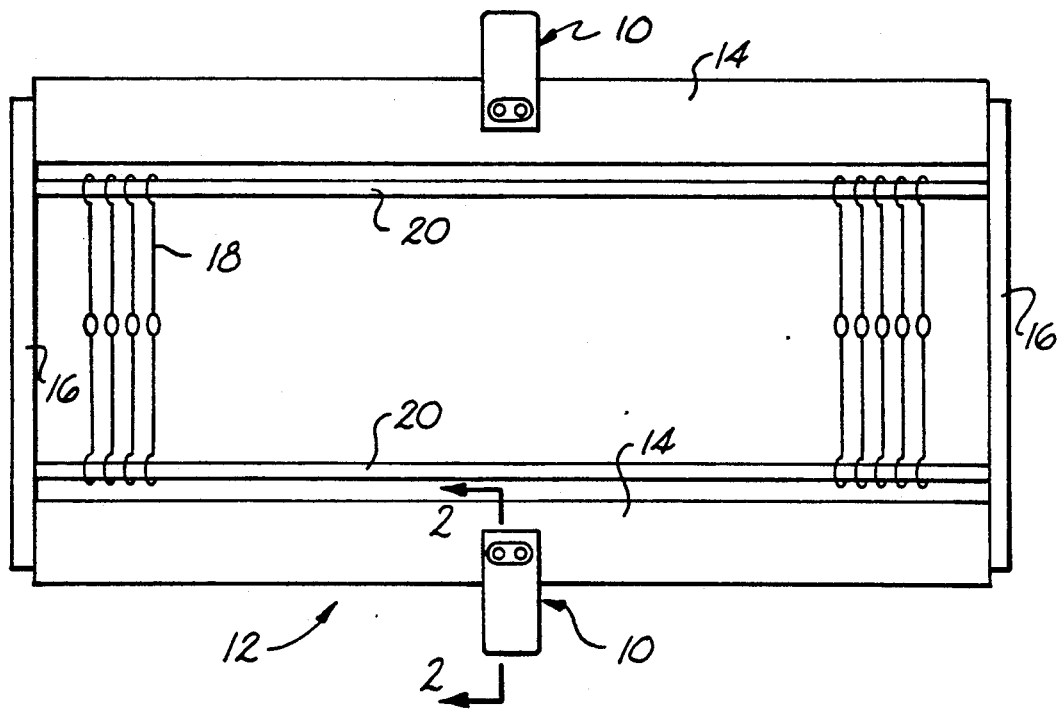
FIG. 1 is a front elevation illustrating a heddle frame having a nose guide mounted thereon by a fastening device constructed in accordance with the present invention.

The invention relates generally to a fastening mechanism for attaching a nose guide generally designated by the reference character 10 to a harness frame generally designated by the reference character 12 of a weaving loom. While FIG. 1 only shows a single nose guide 10 attached to a slat 14 of the harness frame, it is to be understood that depending on the particular weaving machine being used more than a single nose guide can be utilized with the heddle frame. The heddle frame as shown in FIG. 1 includes a pair of elongated spaced slats 14 that are joined together by vertically extending side struts 16. Heddles 18 are carried between spaced rails 20 that are in turn secured by any suitable conventional means to the side struts. All of the details of the heddle frame are not disclosed since this invention merely pertains to the fastening mechanism for securing the nose guide 10 to the slats 14 of the heddle frame. Slats shown in the preferred embodiment are constructed of extruded aluminum and are substantially rectangular in cross section with a hollow portion interposed between spaced side walls 22 and 24 of the extrusion. In recent years, the nose guides 10 have generally been manufactured of plastic material. However, there are many customers who still prefer using wooden nose guides mounted on aluminum slats. This presents a problem in that the side plates which extend over the slats sometimes begin to warp and wear out as a result of the rubbing action during the weaving operation. In order to hold the side plates 26 and 28 flush against the slat 14, a fastening mechanism constructed in accordance with the present invention is utilized.

Figure 2:
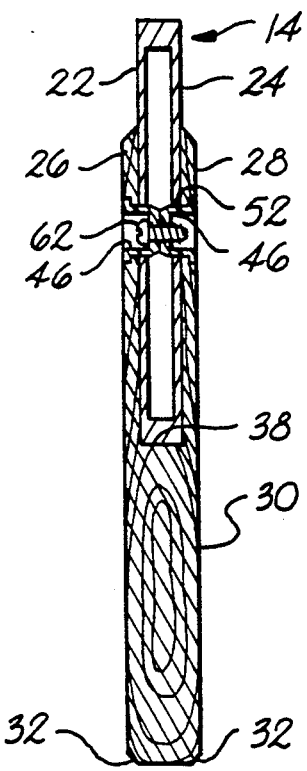
FIG. 2 is a sectional view taken along line 2—2 of FIG. 1 illustrating the nose guide.
Figure 3:
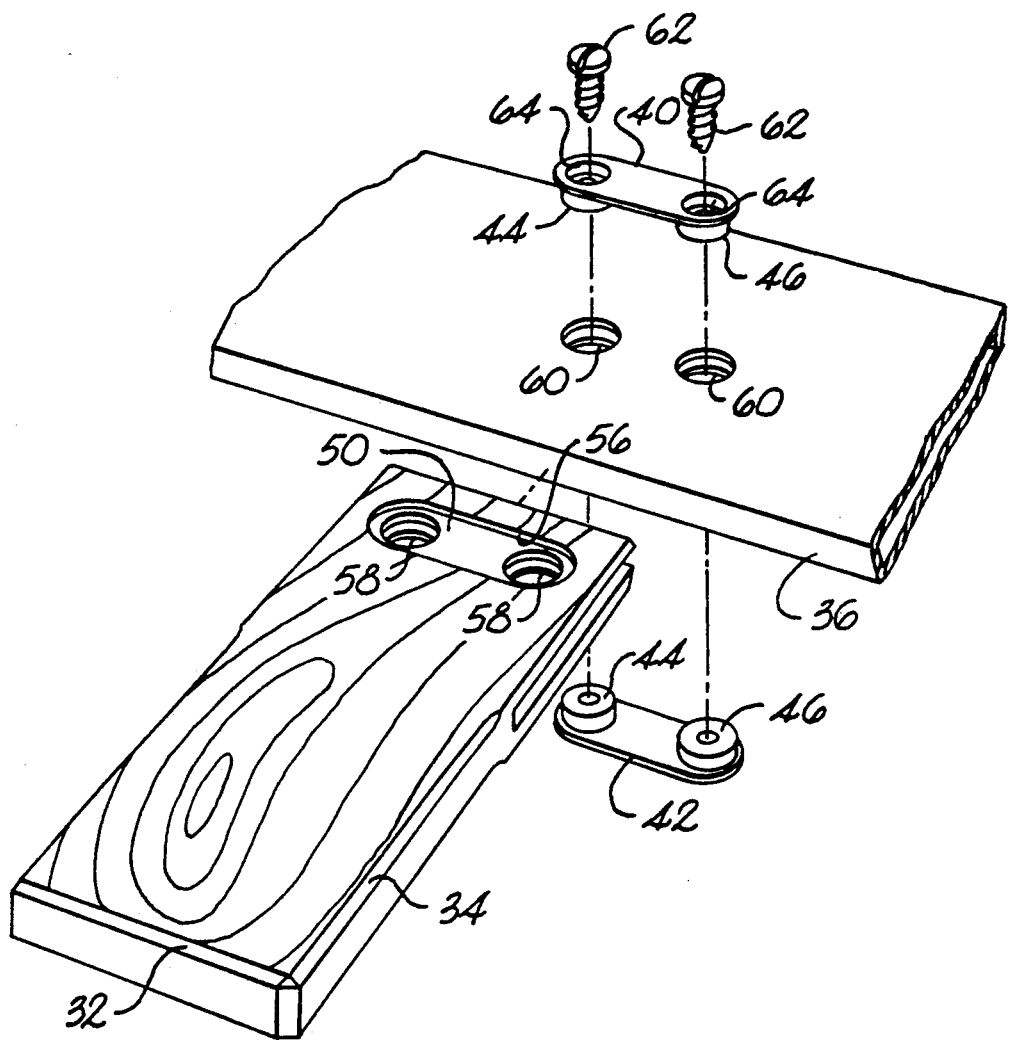
FIG. 3 is a perspective view of a preferred form a fastening mechanism for securing the nose guide to a slat of a heddle frame.

The nose guide 10 includes a head portion 30 which has bevelled edges 32 provided on the top thereof and adjacent the edges of the head portion as identified by the reference character 34. This bevel, in one particular embodiment, is at an angle of 45°. The head portion 30 terminates in the spaced side plates 26 and 28. The side plates 26 and 28 are spaced apart sufficiently to allow the nose guide to slide over the slats as shown in FIGS. 1 and 2. The nose guide is pushed on the slat until an edge 36 of the slat abuts against the end of the slot 38.

The fastening mechanism for securing the nose guide to the slat 14 includes a pair of elongated straps 40 and 42, each having an inner and outer surface. A pair of circular spaced bosses 44 and 46 are carried on the inner surface of each of the elongated straps. Elongated recess 50 and 52, complimentary in shape to the elongated straps, are provided in the side plates of the nose guide for receiving the elongated straps 40 and 42. Extending around the top portion of the elongated recess 50 and 52 is a shoulder 56 upon which the inner surface of the straps 40 and 42 rest. Circular holes 58 corresponding in size to the bosses 44 and 46 are provided in the side walls of the nose guide. Similar side holes 60 are provided in the side of the slat 14. Self threading screws 62 are used for securing the nose guide onto the slat 14. The screws extend into recess 64 provided in the straps and as shown in FIG. 2, are threaded through the bosses 44 and 46 of the opposing straps to draw the side plates of the nose guide 10 flush against the side of the slats.

When in a secured position, straps 40 and 42 rest on the shoulders 56 so that the top portion of the strap is flush with an outer surface of the side plates 26 and 28 of the nose guide. During operation of the weaving loom, the nose guides will wear and as a result, have to be replaced. In order to replace the wooden nose guides 10, it is only necessary to remove the screws 62 and substitute a new nose guide utilizing the same fastening mechanism.

While the preferred embodiment and invention has been described using specific terms, such description is for illustrative purposes only, and it is to be understood that changes and variations may be made without departing from the spirit or scope of the following claims.

We claim:

1. In combination with a harness frame a nose guide including a fastening mechanism for attaching said nose guide to a harness frame for a weaving loom, said nose guide having a pair of spaced side plates terminating in a head portion, said harness frame including a pair of spaced slats, said side plates extending over opposed sides of a respective slat, said fastening mechanism comprising:
   a pair of elongated straps each having an inner and outer surface,
   a pair of spaced bosses carried on said inner surface of said elongated straps,
   elongated recesses complementary in shape to said elongated straps provided in said side plates for receiving said straps, and
   fastening means extending through said bosses for securing opposed straps together for attaching said nose guide to a slat of said harness frame.

2. The nose guide as set forth in claim 1 further comprising:
   a pair of spaced holes provided in said elongated recesses in said side plates for receiving said bosses carried on said straps so that said bosses of opposing straps abut against each other when securing said nose guide on said slat of said harness frame.

3. The nose guide as set forth in claim 1 wherein said nose guide is made of wood and said straps are made of nylon.

4. The nose guide as set forth in claim 3 wherein said slats of said harness frame are made of aluminum.

5. The nose guide as set forth in claims 1 further comprising recessed shoulders extending around said elongated recesses in said side plates,
   said straps being supported on said recessed shoulders so that when said fastening means are drawn down tightly said elongated straps pull said opposed side plates flush against said slat.

6. The nose guide as set forth in claim 1 wherein said fastening means are screws.

7. In combination with a harness frame a nose guide including a fastening mechanism for attaching said nose guide to a harness frame for a weaving loom, said nose guide having a pair of spaced side plates terminating in a head portion, said harness frame including a pair of spaced slats, said side plates extending over opposed sides of a respective slat, said fastening mechanism comprising:
   a pair of elongated straps each having an inner and outer surface,
   elongated recesses complementary in shape to said elongated straps provided in said side plates for receiving said straps,
   recessed shoulders extending around said elongated recesses in said side plates,
   fastening means extending through said straps for securing opposed straps together for attaching said nose guide to a slat of said harness frame, and
   said straps being supported on said shoulders so that when said fastening means are drawn down tightly, said elongated straps pull said opposed side plates flush against said slat.

* * * * *